United States Patent [19]

Adams, Jr.

[11] 4,297,011

[45] Oct. 27, 1981

[54] PHOTOFLASH DEVICE

[75] Inventor: James R. Adams, Jr., Littleton, Colo.

[73] Assignee: Rollei of America, Inc., Littleton, Colo.

[21] Appl. No.: 37,814

[22] Filed: May 10, 1979

[51] Int. Cl.³ ............................................. G03B 7/16
[52] U.S. Cl. ................................ 354/23 D; 354/60 F; 354/289
[58] Field of Search .............. 354/23 D, 33, 53, 60 F, 354/60 E, 602, 127, 128, 145, 289, 32; 235/64.7; 356/213, 218; 315/129, 133; 250/214 P

[56] References Cited

U.S. PATENT DOCUMENTS

| 2,232,373 | 2/1941 | Dorst | 315/156 |
| 3,269,287 | 8/1966 | Ost | 315/156 |
| 3,313,939 | 4/1967 | Specer | 250/212 |
| 3,651,744 | 3/1972 | Okada | 356/226 |
| 3,783,336 | 1/1974 | Vital | 315/159 |
| 4,035,814 | 7/1977 | Nobusawa | 354/23 D |
| 4,067,024 | 1/1978 | Quinn | 354/32 |

FOREIGN PATENT DOCUMENTS

| 2549495 | 5/1976 | Fed. Rep. of Germany. |
| 2743779 | 4/1979 | Fed. Rep. of Germany. |
| 1139286 | 1/1969 | United Kingdom. |
| 1275650 | 5/1972 | United Kingdom. |
| 1292053 | 10/1972 | United Kingdom. |
| 1361392 | 7/1974 | United Kingdom. |
| 1421834 | 1/1976 | United Kingdom. |
| 1476344 | 7/1977 | United Kingdom. |
| 1519183 | 7/1978 | United Kingdom. |
| 1526834 | 10/1978 | United Kingdom. |

Primary Examiner—L. T. Hix
Assistant Examiner—Stafford D. Schreyer
Attorney, Agent, or Firm—Allegretti, Newitt, Witcoff & McAndrews

[57] ABSTRACT

A control/calculator device for an associated camera photoflash system, wherein a plurality of photographic variables are manually entered into the device for responsively controlling automatic flash termination and visual display of photographic information including calculated distance information.

45 Claims, 3 Drawing Figures

PHOTOFLASH DEVICE

BACKGROUND OF THE INVENTION

The invention relates generally to automatic photoflash calculator systems and more particularly to a unique calculator apparatus for providing visual display of photographic information to the operator of the system.

Automatic photoflash systems are generally well known in the art. Basically, a light producing means is selectively actuated to furnish light for the illumination of a scene to be photographed. A light sensing means senses light received back from the scene and, upon receipt of a predetermined quantity of light, generates a quench signal which is effective to terminate the light being produced.

In automatic-calculator type systems, there are a plurality of variable which must be coordinated for an optimum picture. For example, the power level of the light producing means, partially determines the quantity of light available to illuminate a scene being photographed. The film speed used in the camera of the photographic system determines the sensitivity of the film to light received from the scene. The camera-to-scene distance, affects the amount of time required between the generation of a flash and the actual termination thereof, in order to properly expose the light sensitive film of the camera. The f-stop setting of the lens system of the associated camera is related to the proportion of light impressed on the face of the camera which is received at the film plane.

While calculators per se provide a measure of correlation of the several variables, they have not been sufficiently integrated within an associated photographic system, to afford maximum automation of operation.

SUMMARY OF THE INVENTION

It is an object of the present invention to provide an automatic photoflash calculator which effectively coordinates a plurality of photographic variables in order to permit an optimum photographic reproduction of a selected scene.

It is further object of the present invention to provide a calculator which is selectably operable to input different values of effective power level, film speed, and f-number setting for a camera lens system which will produce an optimum photograph for those values.

It is yet another object of the present invention to simplify the calculation of distance information which is to be displayed to the photographer.

In accordance with these and other objects there has been provided a photographic device which is operable to coordinate selectively input values of a plurality of photographic variables for aiding the operator in the picture taking process.

DESCRIPTION OF THE PREFERRED EMBODIMENT

Figure 1:
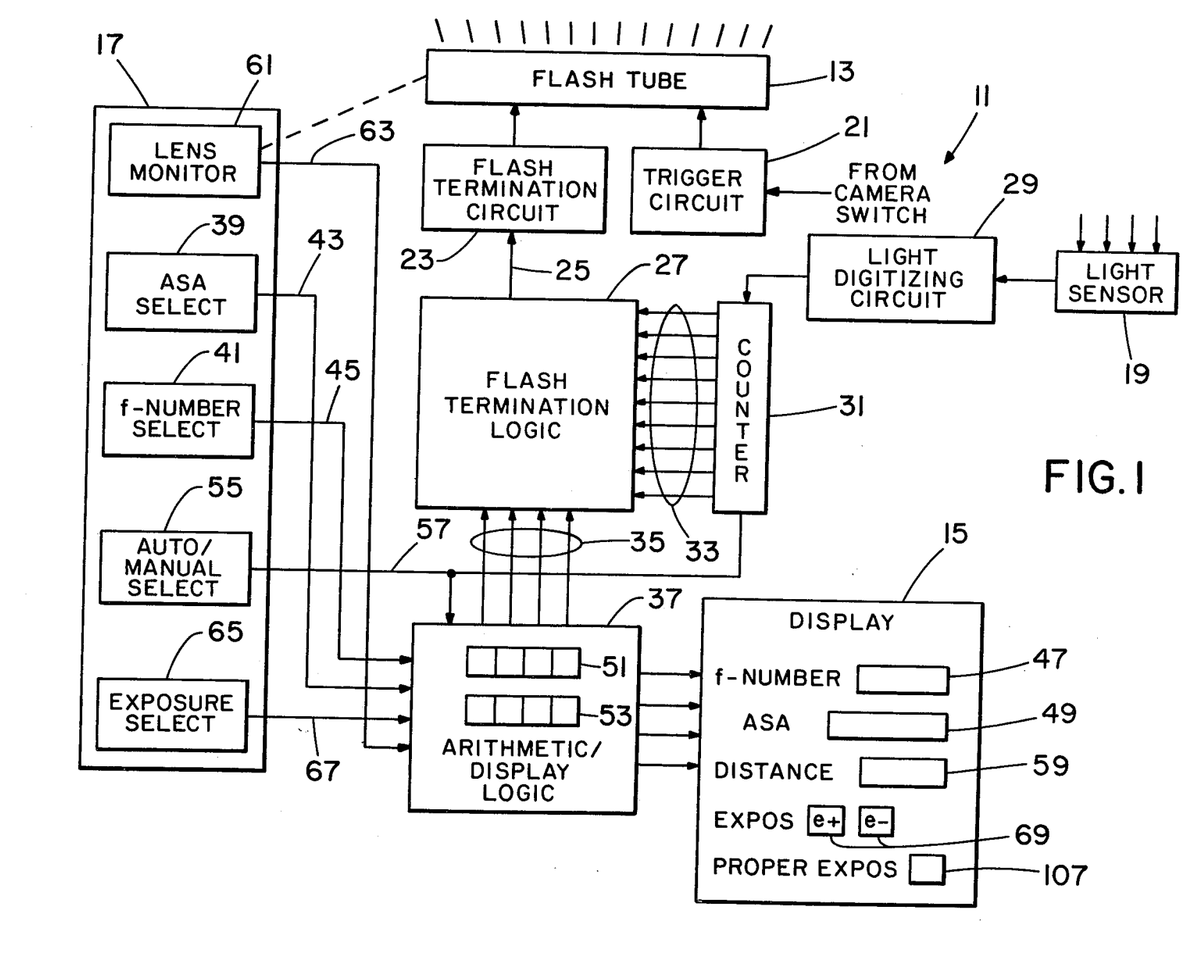
FIG. 1 is a block diagram showing the general functioning blocks of the preferred embodiment of the invention.

Referring to FIG. 1, a photoflash device embodiment is illustrated in which a calculator/control circuitry, generally identified by reference numeral 11, controls termination of a flash tube 13 and calculates display information for operation of a display device 15, according to input data manually entered by the photographer at a selection input 17 and according to information monitored by a light sensor 19.

Flash tube 13 is actuated by a trigger circuit 21 responsive to the photographer depressing a camera switch (not shown) for photographing a desired subject or scene. The flash tube is powered by circuitry not shown to produce a light output, the duration of which may be automatically controlled via a flash termination circuit 23. Termination circuit 23 responds to a control signal developed along a lead 25, for terminating the flash of tube 13.

When operating in an automatic mode, calculator/control circuitry 11 automatically terminates the flash after a predetermined quantity of light has been received from the subject or scene being photographed. The circuitry automatically controls the duration of the flash produced from flash tube 13, as necessary to cause a predetermined quantity of light from the illuminated subject to fall on the film of an associated camera in order to provide proper exposure to the camera film.

A flash termination logic 27 provides the termination signal along lead 25 after a predetermined quantity of light energy has been monitored by light sensor 19. Light sensor 19 may include a photodiode or other light sensitive device which produces an output current having a magnitude related to the intensity of light received at sensor 19.

The output current produced by sensor 19 is fed to a light digitizing circuit 29 which transduces the output current into a plurality of digital output pulses, with each pulse representing a discrete quantity of light energy received by light sensor 19. Reference is made to a copending patent application of Frank Ogawa, Ser. No. 999, filed Jan. 4, 1979, and assigned to the same assignee as the present application, which illustrates light digitizing circuits.

A binary counter 31 is connected to light digitizing circuit 29 for counting according to pulses produced by circuit 29 and for generating a binary count output along output leads 33. Since each pulse produced by light digitizing circuit 29 substantially represents an equal quantity of light energy received at the light sensor in time, the total quantity of light energy received is represented by the binary count appearing on leads 33.

The binary count is fed to logic 27 which monitors the count in view of data signals provided along a plurality of leads 35 from an arithmetic/display logic 37. Selection input 17 provides information to arithmetic/display logic 37 for determination of the required amount of light energy necessary for the proper exposure of the camera film. When the count of counter 31 indicates that the required amount of light has been reached, the flash is terminated via flash termination circuit 23.

Selection input 17 includes an ASA selection device 39 and an f-number selection device 41 which permit the photographer to enter data related to the particular ASA film speed of the associated camera film being used and the particular f-number selected at the lens system of the camera. The ASA film speed and f-number data will determine the total quantity of light energy needed at the front of the lens of the camera, as monitored by light sensor 19, in order to provide the correct amount of light energy to the camera film for proper exposure.

As will suggest itself, the mathematical relationship of the ASA film speed, the f-number and the total light energy being received at the camera, will determine the general calculation to be performed by arithmetic/display logic 37 in order to provide the proper data signals along leads 35 to control flash termination. Logic 27 monitors the changing binary count appearing on leads 33 until the binary count reaches a represented light energy level dictated by the data signals from leads 35.

Conventional f-numbers on a camera are associated with lens-stop positions and are arranged so that each next higher f-number corresponds to a factor of 2 reduction in the transmitting power of the camera lens, i.e., each halving of light to be received by the film is equivalent to a change to the next higher f-number, otherwise referred to as a change of one f-stop position. Similarly, a power of two increase in the film-received light, is equal to a decrease of one f-stop position.

As discussed in a copending application of Dennis Wilwerding and John Dick, Ser. No. 1,015, filed Jan. 4, 1979, and assigned to the same assignee as the present application, flash termination logic 27 may be constructed for monitoring a single bit position of counter 31, selected from the plurality of bits available on leads 33, where the single bit indicates that a specific quantity of light has been received by sensor 19. In the preferred embodiment, logic 27 is constructed for monitoring a single bit position of counter 31 as identified by the binary signal appearing on leads 35.

A change in the f-number input would require a shift in the sole bit position being monitored by flash termination logic 27. A change in the ASA number of the film, also would require a similar shift of the single bit position being monitored by flash termination logic 27 where the change in ASA number is of a magnitude of a power of two. For example, where a shift is made in the sequence of ASA film speeds, 800, 400, 200, 100, 50 and 25, a single positional shift in ASA speeds, changes the total light energy required by a power of two, hereinafter referred to as a change of 1 EV which is equivalent to a change of one f-stop. Thus, a change of 1 EV (doubling or halving the total light required) causes a 1-bit positional change in the sole bit being monitored in counter 31.

ASA selection device 39 and f-number selection device 41 are manually operable, by push-button or the like, for generating successive pulses along respective leads 43, 45 to arithmetic/display logic 37. As each push-button is held down, pulses are generated at a fixed rate until the push-button is released. As will be understood, the push buttons may merely change the voltage level appearing on leads 43, 45 for controlling pulse generating devices housed in logic 37.

Arithmetic/display logic 37 controls display device 15 for providing an appropriate output visual display in accordance with information input from selection input 17. Display device 15 includes an f-number display 47 and an ASA display 49 which comprises 7-segmented light display devices, or the like, for displaying visual information in response to binary display signals generated by arithmetic/display logic 37.

F-number display 47 displays the particular f-number effectively entered by the photographer through f-number selection device 41. As the photographer operates the f-number selection device pulses produced along lead 45 increment display 47 in succeeding f-numbers. When display 47 reaches the f-number desired by the photographer, the photographer discontinues operation of the selection device.

In like manner, ASA display 49 displays the particular ASA film speed selected by the photographer through ASA selection device 39. As the photographer operates ASA selection device 39, pulses generated along lead 43 increment ASA display 49. The photographer is thus aware of the f-number and ASA information inputted via selection input 17.

Pulses generated along lead 45 from f-number selection device 41 serve to increment a counter 51. In the preferred embodiment, the binary value stored in counter 51 is developed along leads 35 for determining the bit position in counter 31 which is to be monitored by logic 27. That is, the value stored in register 51 selects a discrete quantity of light energy to be returned to the face of the camera when the calculator/control circuitry 11 is operating in its automatic mode of operation.

Thus, f-number select 41 actually rolls the bit position being monitored in counter 31 and does not select an absolute f-number. The f-number value displayed in display 47 is, however, formulated from the binary value stored in counter 51 together with the ASA number inputted through selection device 39. Thus, a change in the ASA input will not only change the value in ASA display 49 but will also change the value in f-number display 47, since the quantity of light energy to be received at the face of the camera, as represented by the value in register 51, remains constant.

The pulses generated along lead 43 from ASA selection device 39 serve to increment a 4-bit counter 53. Each of the sixteen counts of counter 53 represents a different ASA film speed. The count stored in counter 53 addresses a read-only memory (as described, hereinafter) for outputting select display signals to display device 15 for displaying an associated ASA value on ASA display 49.

Selection input 17 also includes an automatic/manual selection device 55 which serves as a control switch for generating one of two binary outputs for commanding the operation of the calculator/control circuitry to either an automatic mode or a manual mode of operation. As understood by those in the art, an automatic mode of operation is utilized to automatically control termination of the flash produced by the flash tube after a predetermined quantity of light has been received back from the scene being photographed, as described above.

In a manual mode of operation, however, the flash is terminated by depletion of energy from the flash power supply, as is understood. When in the manual mode, selection device 55 produces a binary output signal along a lead 57 for inhibiting counter 31 from counting according to pulses produced by light digitizing circuit 29. Thus, flash termination circuit 23 is not actuated and the flash is terminated by depletion of energy from the flash power supply. Thus, a regular fixed quantity of light energy is put out by tube 13 when selection device 55 is set to the manual mode of operation.

The binary output from automatic/manual selection device 55 is also fed to arithmetic/display logic 37 for controlling a distance display 59 of display device 15. The distance display visually indicates to the operator distance information pertinent to the mode of operation selected at automatic/manual selection device 55. When the calculator/control circuitry is placed in its automatic mode, the value displayed on distance display 59 represents the maximum distance, between the subject and the camera, at which the automatic termination of the flash will operate properly to provide an acceptable exposure of the film. In the manual mode, however, distance display 59 provides two alternately flashing numeric values representing a respective minimum and maximum distance of a range in which the film will be acceptably exposed when taking a picture in the manual mode.

Selection input 17 also includes a lens monitoring device 61 which serves to communicate with arithmetic/display logic 37 as to which of a plurality of lens arrangements is being used in conjunction with flash tube 13, for serving to modify the distance information on display 59. Lens monitoring device 61 is responsive to each of several lens arrangements (not shown) which may include a plurality of lenses each positionable with respect to flash tube 13 for operating on the light output produced by the flash tube prior to light transmission to the subject being photographed.

In the preferred embodiment, five lens arrangements are utilized: one in which no lens is used and a bare bulb only provides a flash output; a second in which a wide angle lens is used; a third in which a normal lens is used; a fourth in which a telephoto lens is used; and a fifth in which an arrangement directs the flash away from the subject for providing a bounce mode of operation. In the bounce mode, the flash tube may be positioned physically for directing the flash onto a ceiling or adjacent wall for bouncing the flash therefrom and onto the subject being photographed. One of five binary outputs are generated by lens monitoring device 61 according to the particular lens arrangement utilized. The selected lens arrangement being used may mechanically actuate monitoring device 61 for producing the correct binary output along a lead bus 63 to arithmetic/display logic 37.

Selection input 17 further includes an exposure selection device 65 which causes the binary information on leads 35 to be changed appropriately permitting the photographer to shoot an overexposed or an underexposed picture. Exposure selection device 65 generates at least two binary outputs along a lead bus 67 to arithmetic/display logic 37. Logic 37 responds to either of the two outputs from selection device 65 for lighting either of two exposure indicators 69 located on display device 15, for indicating to the operator whether an overexposed or underexposed picture has been selected.

Exposure selection device 65 may comprise two manually actuable buttons, one of which for selection of an overexposed picture and the other of which for the selection of an underexposed picture. Once selected, the selected exposure may be cancelled by simultaneously pressing both buttons.

As an added safety feature, the exposure selection device is only effective to select an underexposure or an overexposure when display device 15 is lighted, as described hereinafter, in order to prevent the inadvertent actuation of exposure selection device 65 from spoiling a picture. Further, the underexposure or overexposure selection is reset each time a picture is taken, in order to prevent spoiling succeeding pictures where the photographer has forgotton that the calculator/control circuitry was set for an underexposure or an overexposure of the camera film.

The arithmetic/display logic 37 further includes circuitry to detect the pressing of the f-number selection and ASA selection buttons at selection input 17, for actuating a timer circuit and causing the displays 47, 49 and 59 to be lit for approximately 15 seconds. A quick pressing and releasing of either the ASA or f-number selection buttons will cause a lighting of the displays without a changein the ASA and f-number values displayed.

Figure 2:
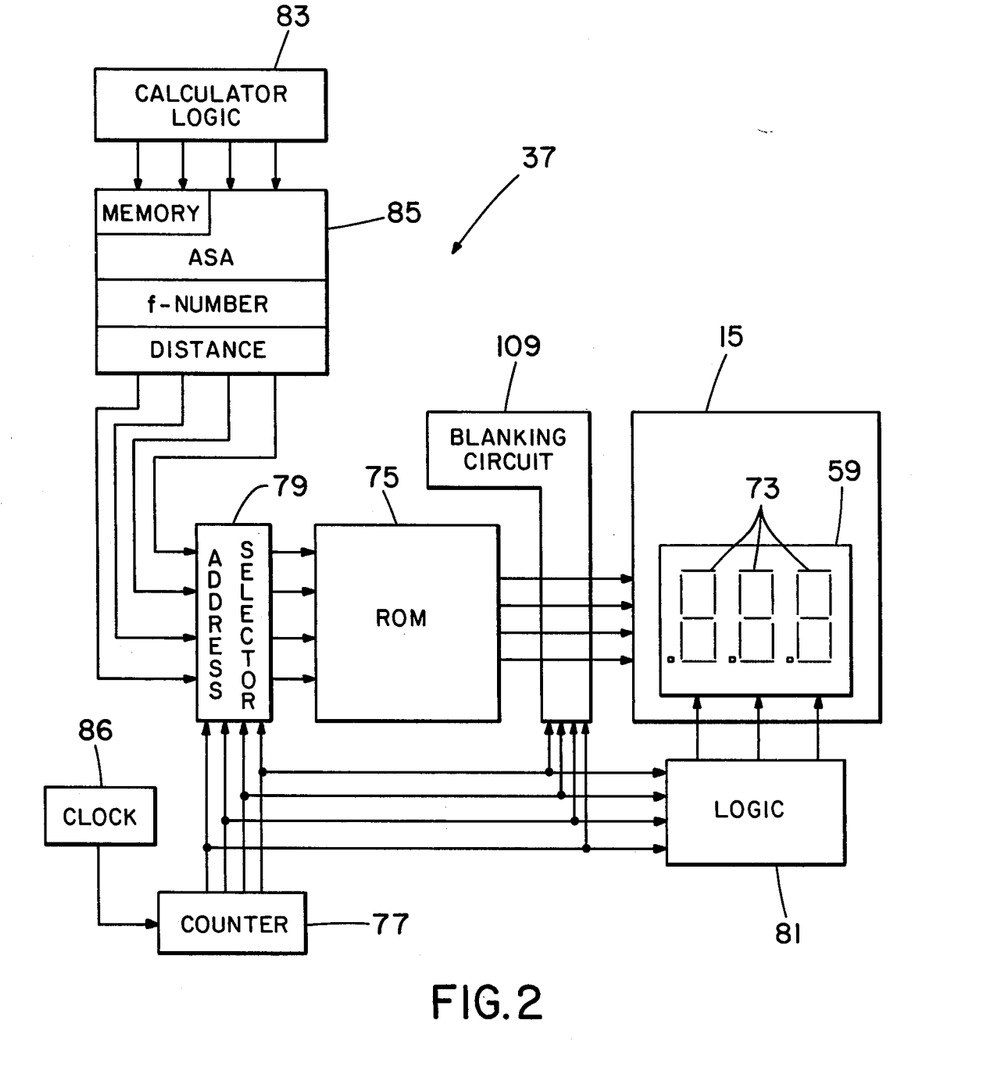
FIG. 2 is a block diagram of the functioning blocks of the arithmetic/display logic of the preferred embodiment.

Referring to FIG. 2, arithmetic/display logic 37 is illustrated in greater detail in conjunction with display device 15. Each of displays 47 and 59 (display 59 being illustrated) includes three 7-segmented display components 73; display 49 includes two 7-segmented display components 73. Binary display signals are fed repetitively to the display device from a read-only memory (ROM) 75 for successively lighting individual display components 73. A counter 77 repeatedly sequences an address selector 79 for addressing ROM 73, to output appropriate display signals.

Similarly, a logic circuit 81 is simultaneously seqeunced by counter 77 for selecting the individual components 73 which are to receive the binary display signals addressed from ROM 75. The successive actuation of display components 73 occur rapidly so that the photographer is not aware that individual components are being lit in successive fashion. As is understood, displays 47, 49 (not shown in FIG. 2) will similarly receive display signals under control of logic 81 and ROM 75.

A calculator logic 83 uses information inputted from selection input 17 to forumulate three addresses when operating in the automatic mode and to formulate four addresses when operating in manual mode. The formulated addresses are utilized to address the locations in ROM 75 of the corresponding ASA, f-number and distance display signals which are to be transmitted to display device 15. The addresses calculated by logic 83 are stored in a memory 85 for repeated use to address ROM 75 via address selector 79.

Address selector 79 successively retrieves one of the three or four addresses stored in memory 85 and utilizes the one address for addressing three display signals from ROM 75 for lighting three display components 73. A clock 86 is utilized to feed counter 77 for controlling the display operation.

FIG. 2 portrays generally the intended display function of arithmatic/display logic 37. As will suggest itself, other methods of formulating display signals may be utilized upon formulation of the ASA, f-number and distance values by calculator logic 83.

When the photographer changes in the ASA value being input via ASA selection device 39, calculator logic 83 formulates a new ASA address. The ASA value displayed by device 15 is correspondingly changed as the new ASA address addresses a new location in ROM 75 where its corresponding three display signals are stored.

Calculator logic 83 calculates each of the three or four ROM addresses according to information provided by selection input 17. The ASA and f-number addresses are calculated according to the values stored in counters 51, 53 (FIG. 1). The distance addresses, however, must be calculated in view of the relationship between f-number, distance, light output and film sensitivity as given by the following distance formula:

$$(f\text{-number}) \times (\text{distance}) = \sqrt{.05 \times ASA \times BCPS}$$

where BCPS is beam candle power seconds.

The above distance formula may be simplified by calling the quantity $\sqrt{0.05 \times ASA \times BCPS}$ the guide number, "GN", which is spoken of as a guide number for a certain ASA. For example, a guide number of 56 for an ASA of 25, implies that when using ASA 25 film:

$$(f\text{-number}) \times (\text{distance}) = 56.$$

The determination of the distance value which is to be displayed may be performed by using an initialized distance found at a given initial f-number, initial ASA and initial GN, and translating the initialized distance value by using information of any change in f-number, ASA and GN relative to their initial values.

Given an initial f-number, $f_i$, any f-number, $f_x$, N stops away from $f_i$ may be determined as follows:

$$f_x = f_i \times 2^{N/2}$$

where a positive value of N represents an increase in f-number above $f_i$ and a negative value of N represents a decrease in f-number below $f_i$.

Thus, given an initial distance, $D_i$, a change to a new distance, $D_x$, caused by a change in N stop positions of the f-number would be $$D_x = \frac{GN_i}{f_x} = \frac{GN_i}{f_i} \times (2^{-N/2})$$

$$= D_i \times (2^{-N/2})$$

where $GN_i$ is the initial guide number.

Where ASA values are selectable in powers of two, e.g., 25, 50, 100, 200, 400, 800, given an initial ASA, $ASA_i$, any ASA, $ASA_x$, M selectable powers of two above or below $ASA_i$ may be determined as follows:

$$ASA_x = ASA_i \times (2^M).$$

Thus, a change in distance caused by a change in M powers of two of the ASA would be:

$$D_x = \frac{1}{f_i} \sqrt{.05 \times ASA_i \times 2^M \times BCPS_i}$$

$$= \left(\frac{1}{f_i}\right) \times GN_i \times 2^{M/2}$$

$$= D_i \times (2^{M/2})$$

Where BCPS values are selectable in powers of two, given an initial BCPS, $BCPS_i$, any BCPS, $BCPS_x$, Q selectable powers of two above or below $BCPS_i$ may be determined as follows:

$$BCPS_x = BCPS_i \times (2^Q)$$

Thus, a change in distance caused by a change in Q powers of two of intensity would be:

$$D_x = \frac{1}{f_i} \sqrt{.05 \, ASA_i \times BCPS_i \times 2^Q}$$

$$= \left(\frac{1}{f_i}\right) \times GN_i \times (2^{Q/2})$$

$$= D_i \times (2^{Q/2})$$

Thus, any distance can be represented in terms of an initial distance and in terms of changes of f-number, ASA and BCPS as follows:

$$D_x = D_i \times 2(M+Q-N)2$$

Thus, where the values M, Q and N are available to calculator logic 83, the simple value $M+Q-N$ may easily be calculated. This value may then be used as an address to ROM 75 for addressing display signals for displaying the proper distance value at display device 15. For example, an increase in ASA by one position (power of 2 change) and a decrease in BCPS by one position (power of two change) would not change the distance value to be displayed. Rather than performing the multiplication, division and square-root calculation required by the distance formula to generate the distance value, the simple addition and subtraction calculation of $M+Q-N$ may be utilized.

While calculator logic 83 may be constructed to derive the values M, Q and N and to perform the simple addition and subtraction to calculate the distance address, the preferred embodiment of calculator logic 83 utilizes the binary value stored in counter 51 in the performance of the addition and subtraction operation, as will now be described. The following description is made in terms of the preferred embodiment, however, changes may suggest themselves to persons skilled in the art.

Figure 3:
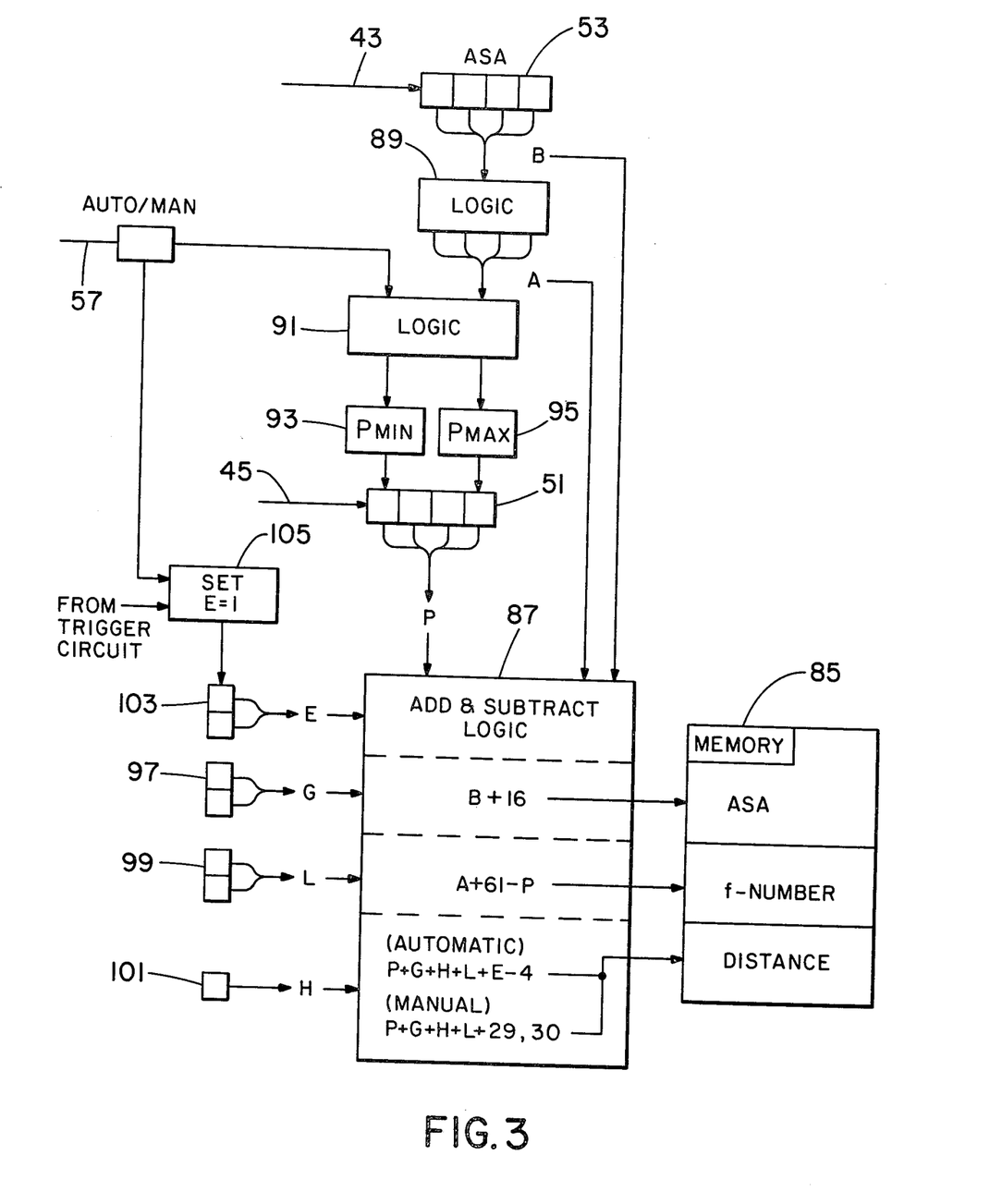
FIG. 3 is a more detailed block diagram of the arithmetic/display logic of the preferred embodiment.

Referring to FIG. 3, the calculator logic 83 includes an ADD AND SUBTRACT logic 87 for formulating the ASA, f-number and distance addresses. The ASA address is formulated from the binary number (B) which is the value stored in counter 53. As understood, counter 53 produces an output of binary signals, e.g., either a high or low voltage for each bit of the counter for indicating a "1" or "0" binary value for each bit of the binary number B.

Sixteen possible ASA values can be displayed with each ASA associated in increasing order with the binary values 0000 through 1111. The binary number B is fed to ADD AND SUBTRACT logic 87 where B is added to a constant, for example "16", which serves to identify the beginning address location in ROM 75 where the sixteen ASA values are coded as display signals. As understood, the numerical constant "16", as well as other constants described below, is selected for convenience and other values for the constant may be used.

The binary count of counter 53 is also fed to a logic circuit 89 for fomulating a binary value A. In instances where it is desired to use ASA film speeds other than the above listed 25, 50, 100, 200, 400 and 800, such other ASA values may be displayed on display device 15; however, logic 89 will redefine these other ASA values as one of the above listed ASA values which are related in terms of powers of two.

For example, an ASA 25 can be utilized in the circuitry to calculate a correct f-number when using an ASA 32 film, and the film will be properly exposed using that f-number. Likewise, ASA 50 can be utilized to calculate f-numbers for use with ASA 40 and ASA 64 film. Thus, when B=0 or 1, corresponding to ASA 25 and ASA 32 respectively, then A=0 corresponding to ASA 25. And where B=2, 3, or 4, corresponding to ASA 40, ASA 50 and ASA 64 respectively, then A=1 corresponding to ASA 50. Thus, B is used to define the ASA numbers to be displayed, whereas A is used to define the ASA values actually used in the calculator circuitry.

In the automatic mode, as described above, the binary number (P) which is stored in counter 51 serves to select one of the bit positions of counter 31 to be monitored. In the preferred embodiment, counter 31 has eleven bit positions, and P selects one of nine light outputs to be produced by the flash. Once P is selected, the f-number is calculated in view of the selected ASA. It is desired that the selection of P be limited so that the resulting f-numbers be no larger than f/16 nor smaller than f/1.4. A logic circuit 91 serves to formulate the maximum and minimum P values in view of the binary value A. $P_{max}$ is set equal to the smaller of: (A+9) or (11), and $P_{min}$ is set equal to the larger of: (A+2) or (3). For example, an ASA 25 sets B=0 and A=0. Thus, $P_{min}=3$ and $P_{max}=9$. Therefore, upon command from f-number selection device 41, counter 51 cycles from 3 through 9 and begins again at 3. The diagram blocks 93, 95 are illustrative only representing the intended function of logic 91 to control the maximum and minimum count permitted by counter 51.

In order to formulate the f-number addresses for storage in memory 85, the binary number P is fed to ADD AND SUBTRACT logic 87 where P is subtract from the sum of A plus a constant "61". The constant "61" serves in the logic 87 to identify the beginning address location in ROM 75 where the f-numbers, f/1.4 through f16, are coded as display signals.

The calculation of the distance addresses by ADD AND SUBTRACT LOGIC 87 is performed according to the formula P+G+H+L+E−4 when in the automatic mode, and by the formula P+G+H+L+29, 30 when in the manual mode. Two addresses are calculated in the manual mode for displaying alternately a minimum and maximum distance from the subject, within which the film will be properly exposed.

The value G is a two bit binary number representative of the particular guide number of the flash power being used. The value G is originally established in the circuitry by the manufacturer for permitting assembly of the calculator with various power level flash systems. In accordance with the above distance formula, a positional change in guide number occurs in half powers of 2 in order to permit simple addition/subtraction by logic 87. For example, for guide numbers of 40, 56, 80 and 112, G=0, 1, 2, 3, respectively. A 2-bit latch 97 is illustrated for storing the value G and outputting G to ADD AND SUBTRACT logic 87.

The value L is a two bit input from lens selection device 61 (FIG. 1) which is indicative of the light pattern being generated by the selected lens. The lenses are designed for effectively lowering and raising the BCPS in terms of powers of 2. The following table illustrates the value L in view of a power of two change from normal, caused by each type of lens:

| Lens | L = | Power of 2 change from Normal lens |
|---|---|---|
| Bare bulb | 1 | −2 |
| Wide angle | 2 | −1 |
| Normal | 3 | 0 |
| Telephoto | 4 | +1 |

Lens selection device 61 outputs a third bit when the lens arrangement is in a bounce mode, for blanking the distance display 59 as described hereinafter. A 2-bit latch 99 is illustrated for storing the value L and outputting L to ADD AND SUBTRACT logic 87.

The value H may be utilized, if desired where the photographer is permitted to manually select an increase in BCPS of the flash output, as for example, effectively adding capacitance to the power supply. Where such a feature is included, the BCPS positional changes should result in BCPS changes in terms of powers of two. A 1-bit latch 101 is illustrated for storing the value H and outputting H to ADD AND SUBTRACT logic 87.

The value E is a 2-bit input from exposure selection device 65 (FIG. 1) indicative of whether an overexposed, normal or underexposed picture is selected. E=0, 1, 2, respectively, for overexposure, normal and underexposure. Thus, a change of one full EV (f-stop) is used to overexpose or to underexpose. A 2-bit latch 103 is illustrated for storing the value E and outputting E to ADD AND SUBTRACT logic 87.

The value E, in effect, changes the number of counter pulses required for quenching the flash tube by modifying the value of P before transmission on leads 35 to flash termination logic 27; the value P+E−1 is transmitted on leads 35. The value E does not change the binary value stored in register 51 so that the f-number address may be calculated directly in terms of P. Thus, when overexposing or underexposing, display 15 will indicate a new distance range but the f-number display and the ASA display will remain the same.

Exposure indicators 69 (FIG. 1) are lit according to the value E stored in latch 103. Indicators 69 when lit provide a visual indication to the photographer that the present picture to be taken will be either overexposed or underexposed. In order to prevent inadvertent operation of exposure selection device 65, the value E is prevented from being stored in latch 103, except when display device 15 is lit.

A reset circuit 105 (FIG. 3) is provided and is responsive to trigger circuit 21 for producing a reset signal to latch 103 for commanding the storage of the value E=1. This resets exposure displays 69 and leads 35 to normal exposure mode after each flash to prevent unwanted exposure modification due to forgetfulness on the part of the photographer. Similarly, operation of automatic/manual selection device 55 to the manual mode actuates reset circuit 105 for setting latch 103 to E=1, in order to prevent exposure selection device 65 from operating in the manual mode. In the preferred embodiment, exposure selection device 65 cannot be used when the photoflash device is in its manual mode.

As will be appreciated, automatic/manual selection device 55 provides an input to arithmetic/display logic 37 for indicating whether the operator desires to take a picture in the automatic mode or in the manual mode. This information is utilized by logic 37 for determining whether the value displayed by distance display 59 is the single numeric value or the two numeric values which indicate a range of distances.

The two display signals stored in ROM 63 which are utilized in the manual mode, display two distance values, one of which is one half an EV (f-stop) above the distance normally to be displayed when in the automatic mode, while the other distance value is one-half an EV below the distance normally displayed. For example, where distance for proper exposure is 10 feet, one-half EV under (8.3 feet) and one-half EV over (12.2 feet) are displayed to give the photographer a distance range. An increase of 1 EV will start the next distance range at 12.2 feet.

When in the manual mode of operation, it is not necessary to restrict the maximum value of P (the larger the binary value of P, the smaller the f-number) since the flash termination logic is not operated. Therefore, when in the manual mode, small f-numbers with corresponding distance values may be displayed. In the preferred embodiment $P_{max}$ is redefined as the smaller of: (A+9) or (20−G−H−L). $P_{min}$ is defined in the manual mode the same as in the automatic mode.

Referring again to FIG. 1, display device 15 may further include a correct exposure annunciator 107. The annunciator may be actuated in the automatic mode after a flash has been taken in order to indicate to the photographer that a proper exposure has occurred. Once counter 31 achieves a count within one-half EV (f-stop) from the count selected along leads 35, the correct exposure annunciator is actuated. Thus, flash termination logic 27 monitors the signal appearing along leads 33 in view of the binary value fed along leads 35, for actuation of annunciator 107. In the manual mode, the annunciator is not operated.

Where a sole bit of the signal appearing on leads 33 is monitored for flash termination, an annunciator signal is generated when the immediate two least significant bits adjacent to the sole bit are high, indicating that a quantity of light substantially one-half EV less than the quantity of light represented when the sole bit is high, has occurred. The annunciator signal is fed to proper exposure annunciator 107.

When operating with the bounce mode lens arrangement, arithmetic/display logic 37 blanks selected output lines of ROM 75 via blanking circuit 109 (FIG. 2) for blanking distant display 59. This is done because in the bounce mode distance values cannot be determined accurately since it is not known the distance to the object from which the flash will be bounced. The operator may merely perform one or more test flashes in the automatic mode, and check for a proper exposure via annunciator 107. If exposure annunciator 107 is lit, the photographer knows that a bounce flash used from that position to photograph the subject will produce an acceptable exposure.

Blanking circuit 109 performs the above described blanking and lighting of display 15. When the display is to be selectively blanked, the blanking circuit in conjunction with counter 77 inhibits the ROM display signals from reaching display device 15 during the time when logic 81 is attempting to cause display components 73 of display 59 to be lit.

In operating the photoflash device of the disclosed embodiment of the present invention, a photographer initially selects whether the device is to be operated in its automatic or manual mode, via selection device 55. The ASA speed of the film being used and the f-number of the camera lens system of the associated camera, are entered via selection devices 39, 41. The calculator circuitry responds by providing binary input information to arithmetic/display logic circuit 37. The particular lens system utilized by the photographer is automatically monitored by lens monitoring device 61 and a binary signal is inputted to logic 37.

Arithmetic/display logic 37 then interprets the logic data for displaying a visual representation of the f-number and the ASA speed entered by the photographer and for displaying a calculated distance within which the flash may be utilized.

Where the operator desires to overexpose or underexpose, the operator inputs the desired exposure via exposure selection device 65 which in turn generates binary information to arithmetic/display logic 37 which lights the proper exposure indicators 69. Logic 37 further controls the flash termination logic 27 for either overexposing or underexposing the camera film.

It should be understood, of course, that the foregoing relates to preferred embodiments of the invention and that other modifications or alterations may be made therein without departing from the spirit or scope of the invention as set forth in the appended claims.

I claim:

1. In a photoflash system having a flash device and means for firing the latter to produce light on a subject to be photographed, a display apparatus for visually displaying, prior to flash of the flash device, a maximum distance value representative of the maximum distance from the subject at which a subsequent flash will properly expose the film of an associated camera, comprising:

memory means having a plurality of memory address locations, each of which storing distance display signals representative of a maximum distance value, said memory means being responsive to memory address signals for outputting distance display signals;

ASA input means manually actuable by the photographer for inputting ASA data representative of one of a plurality of ASA film speeds, each of the film speeds representable being a power of two multiple of an ASA film speed, said input means commanding generation of first binary signals representative of the power of two change in ASA of the represented ASA input from an initiated ASA film speed value;

f-number means manually actuable by the photographer for inputting f-number date representative of a camera f-number, said f-number input means commanding generation of second binary signals representative of a change in f-stop positions of the represented f-number input from an initialized f-number value;

arithmetic means for receiving inputs of said first and said second binary signals, and generating memory address signals for addressing a memory address location in said memory means for commanding output of distance display signals from said memory means, said address location being dependent on the relative change of both the represented ASA and f-number from their respective said initialized values; and display means responsive to said distance display signals output from said memory means for displaying a maximum distance value representative of the maximum distance at which a subsequent flash will properly expose film of an ASA speed inputted by said ASA input means, of an associated camera set at an f-number inputted by said f-number input means.

2. A display apparatus according to claim 1 wherein said processing means generates said memory address signals according to the relative difference in binary magnitude of said first and said second binary signals.

3. A display apparatus according to claim 2 wherein said arithmetic processing means receives inputs of said first and said second binary signals for generating said memory address signals according to the result of the binary subtraction of the binary number represented by said first binary signals.

4. A display apparatus according to claim 1 wherein said ASA input means includes means manually actuable by the photographer for generating third binary signals representative of one of a plurality of ASA film speeds; logic means for converting said third binary signals to said first binary signals; and wherein said memory means is responsive to said third binary signals for addressing ASA display signals; and wherein said display means is responsive to said ASA display signals for displaying ASA information.

5. A display apparatus according to claim 1 wherein said ASA input means includes means manually actuable by the photographer for commanding generation of successive signal pulses and wherein said arithmetic processing means includes counter means responsive to each of said signal pulses for counting according thereto.

6. A display apparatus according to claim 1 and further including flash termination means for controlling the duration of the flash of the flash device; and wherein said arithmetic processing means outputs third binary signals to said flash termination means for establishing said duration.

7. A display apparatus according to claim 6 wherein said flash termination means includes:
light sensor means for monitoring light received back from the subject being photographed;
light digitizing means coupled to said light sensor means for producing successive pulse outputs, each pulse output representative of a discrete quantity of light monitored by said light sensor means;
counter means connected to received said pulse outputs of said light digitizing means, for producing a count output in accordance with the number of said pulse outputs received; and
logic means responsive to said third binary signals from said arithmetic processing means and responsive to said count output from said counter means, for terminating the flash of the flash device.

8. A display apparatus according to claim 7 wherein said logic means monitors a sole bit in said count output of said counter means for terminating the flash, said sole bit determined by said third binary signals from said arithmetic processing means.

9. A display apparatus according to claim 1 wherein said memory means includes;
a memory device having an address input and for outputting distance display signals; and
addressing means responsive to said memory address signals for providing an input to said address input for outputting distance display signals.

10. In a photoflash system having a flash device and means for firing the latter to produce light on a subject to be photographed, a display apparatus for visually displaying distance information to the photographer, comprising:
ASA input means mutually actuable by the photographer for inputting ASA data representative of one of a plurality of ASA film speeds, each of the film speeds representable being a power of two multiple of an ASA film speed, said ASA input means commanding generation of first binary signals representative of the power of two change in ASA of the represented ASA input from an initialized ASA film speed value;
f-number input means manually actuable by the photographer for inputting f-number data representative of a camera f-number, said f-number input means commanding generation of second binary signals representative of a change in f-stop positions of the represented f-number input from an initialized f-number value;
value input means manually operable by the photographer for selecting exposure modification data, said value input means for inputting data representative of one of a plurality of values of a photographic variable indicative of exposure modification, each of the values representable being a power of two multiple of a value of the photographic variable, said value input means commanding generation of third binary signals representative of the power of two change of the represented value input from an initialized value of the photographic variable;
arithmetic processing means for receiving inputs of said first, said second and said third binary signals and generating fourth binary signals representative of a binary number having a magnitude dependent on the relative change of the represented ASA, f-number and the said photographic variable from their respective said initialized values;
generation means responsive to said fourth binary signals for generating distance display signals; and
display means responsive to said distance display signals from said generation means for displaying visual distance information, whereby distance value may be displayed representative of a distance at which a picture taken with the photoflash system will be underexposed or overexposed.

11. A display device according to claim 10 and further including flash termination means for controlling the duration of the flash of the flash device; and wherein said arithmetic processing means outputs fifth binary signals to said flash termination means for establishing said duration, said fifth binary signals dependent on the binary value of said fourth binary signals.

12. In a photoflash system having a flash device and means for firing the latter to produce light on a subject to be photographed, a display apparatus for visually displaying, prior to flash of the flash device, a maximum distance value representative of the maximum distance from the subject at which a subsequent flash will properly expose the film of an associated camera, comprising:
ASA input means manually actuable by the photographer for inputting ASA data representative of one of a plurality of ASA film speeds, each of the film speeds representable being a power of two multiple of an ASA film speed, said ASA input means commanding generation of first binary signals representative of the power of two change in ASA of the represented ASA input from an initialized ASA film speed value;
f-number input means manually actuable by the photographer for inputting f-number data representative of a camera f-number, said f-number input means commanding generation of second binary signals representative of a change in f-stop positions of the represented f-number input from an initialized f-number value;

value input means for inputting data representative of one of a plurality of values of a photographic variable, each of the values representable being a power of two multiple of a value of the photographic variable, said value input means commanding generation of third binary signals representative of the power of two change of the represented value input from an initialized value of the photographic variable;

arithmetic processing means for receiving inputs of said first, said second and said third binary signals, and generating fourth binary signals representative of a binary number having a magnitude dependent on the relative change of the represented ASA, f-number and the said photographic variable from their respective said initialized values;

generation means responsive to said fourth binary signals for generating distance display signals; and display means responsive to said distance display signals from said generation means for displaying a maximum distance value representative of the maximum distance at which a subsequent flash will properly expose film of an ASA speed inputted by said ASA means, of an associated camera.

13. A display apparatus according to claim 12 wherein said photographic variable in BCPS.

14. A display apparatus according to claim 13 wherein said photographic variable is indicative of the light pattern being generated.

15. A display apparatus according to claim 14 and further including lens means for generating said light pattern.

16. A display apparatus according to claim 15 wherein said lens means includes a plurality of lens arrangements selectable by the photographer.

17. A display apparatus according to claim 16 wherein said value input means automatically inputs said data in response to the lens arrangement selected by the photographer.

18. In a photoflash system having a flash device and means for firing the latter to produce light on a subject to be photographed, a control/calculator apparatus for visually displaying distance information to the photographer, comprising:

ASA input means manually actuable by the photographer for generating first binary signals representative of one of a plurality of ASA film speeds, only some of said speeds being a power of two multiple of an ASA film speed;

f-number input means manually actuable by the photographer for inputting f-number data representative of a camera f-number, said f-number input means commanding generation of second binary signals representative of a change in f-stop positions of the represented f-number from an initialized f-number value;

processing means for receiving said first and said second binary signals and for converting said first binary signals to third binary signals representative of a film speed being a power of two multiple of an ASA film speed, said third binary signals representative of the power of two change in ASA of the represented ASA film speed from an initialized ASA value, said processing means responsive to said second and third binary signals for generating fourth binary signals for controlling termination of the flash of the device;

memory means responsive to said first signals for generating ASA display signals; and display means responsive to said ASA display signals for displaying its represented ASA film speed.

19. A control/calculator apparatus according to claim 18 wherein said processing means generates fifth binary signals representative of a binary number having a magnitude dependent on the relative change of both the ASA speed represented by said third binary signals and the f-number represented by said second binary signals from their respective said initialized values; and wherein said memory means is responsive to said fifth binary signals for generating distance display signals; and wherein said distance display means is responsive to said distance display signals for displaying distance information.

20. A control/calculator apparatus according to claim 19 wherein said processing means generates fifth binary signals representative of the relative difference in binary magnitude of said second and said third binary signals.

21. A control/calculator apparatus according to claim 20 wherein said processing means generates fifth binary signals representative of the result of the binary subtraction of the binary number represented by said second binary signals from the binary number represented by said third binary signals.

22. A calculator/control apparatus according to claim 18 wherein said ASA input means includes means manually actuable by the photographer for commanding generation of successive signals pulses; and wherein said processing means includes counter means responsive to each of said signal pulses for counting according thereto.

23. A calculator/control apparatus according to claim 18 and further including flash termination means for controlling the duration of the flash of the flash device, said flash termination means responsive to said fourth binary signals for establishing said duration.

24. A display apparatus according to claim 23 wherein said flash termination means includes:

light sensor means for monitoring light received back from the subject being photographed;

light digitizing means coupled to said light sensor means for producing successive pulse outputs, each pulse output representative of a discrete quantity of light monitored by said light sensor means;

counter means connected to received said pulse outputs of said light digitizing means, for producing a count output in accordance with the number of said pulse outputs received; and logic means responsive to said fourth binary signals from said processing means and responsive to said count output from said counter means, for terminating the flash of the flash device.

25. A display apparatus according to claim 24 wherein said logic means monitors a sole bit in said count output of said counter means for terminating the flash, said sole bit determined by said fourth binary signals from said processing means.

26. A display apparatus according to claim 18 wherein said memory means includes;

a memory device having an address input and for outputting ASA display signals; and addressing means responsive to said first binary signals for providing an input to said address input for outputting ASA display signals.

27. In a photoflash system having a flash device and means for firing the latter to produce light on a subject to be photographed, a calculator/control apparatus for visually displaying distance information to the photographer, comprising:
first input means manually actuable by the photographer for commanding generation of first binary signals representative of a quantity of light to be received back from the photographed scene to initiate flash termination;
second input means manually actuable by the photographer for commanding generation of second binary signals representative of a value of a first photographic variable;
processing means for receiving inputs of said first and said second binary signals, and generating third binary signals representative of a second photographic variable and for generating fourth binary signals from said first and second binary signals representative of a distance value; and
visual display means controlled by said processing means for displaying a value of said first photographic variable, a value of said second photographic variable and distance information.

28. A calculator/control apparatus according to claim 27 and further including flash termination means for controlling the duration of the flash of the flash device dependent on the magnitude of the binary number represented by said first binary signals.

29. A calculator/control apparatus according to claim 28 wherein sid first photographic variable is ASA film speed; and wherein said second photographic variable is lens f-number.

30. A calculator/control apparatus according to claim 29 wherein each of the film speeds represented by said second binary signals are a power of two multiple of an ASA film speed; and wherein said second binary signals represent the power of two change in ASA of the represented ASA input from an initialized ASA value.

31. A calculator/control apparatus according to claim 27 wherein said visual display means includes: logic memory means responsive to said second, said third and said fourth binary signals for generating display signals; an addressing means for addressing display signals from said memory means at an address location represented by said second, third and fourth binary signals; and a display device responsive to said display signals from said logic memory means for displaying said values of said first and second photographic variables and said distance information.

32. A calculator/control apparatus according to claim 27 and further including logic means for establishing the maximum and the minimum quantity of light representable by said first binary signals in accordance the value representated by said second binary signals.

33. In a photoflash system having a flash device and means for firing the latter to produce light on a subject to be photographed, a display apparatus for visually displaying distance information to the photographer, comprising:
first input means manually actuable by the photographer for generating first binary signals representative of a value of a first photographic variable;
second input means manually actuable by the photographer for generating second binary signals representative of a value of a second photographic variable.
third input means manually actuable by the photographer for generating a manual mode data signal;
processor means responsive to said first binary signals, said second binary signals and said manual mode data signals for generating third binary signals representative of a first distance value and for generating fourth binary signals representative of a second distance value;
visual display means responsive to said third and said fourth binary signals for displaying both said first and said second distance values.

34. A display apparatus according to claim 33 wherein said visual display means alternatively displays said first and said second distance values.

35. Apparatus according to claim 33 and further including flash termination means for automatically controlling the duration of the flash of the flash device in accordance with monitored light, said flash termination means inhibited from operating by said manual mode data signal.

36. In a photoflash system having a flash device and means for firing the latter to produce light on a subject to be photographed, a calculator/control apparatus for modifying the exposure of the film of an associated camera, comprising:
first input means manually actuable by the photographer for generating first binary signals representative of a value of a first photographic variable;
second input means manually actuable by the photographer for generating second binary signals representative of a value of a second photographic variable;
third input means manually actuable by the photographer for generating an exposure modification signal;
light sensing means arranged for monitoring light coming from the photographic scene and for generating third binary signals representative of a total quantity of light monitored;
processor means for receiving said first, said second and said third binary signals and said exposure modification signal, said processor means monitoring a sole bit of the binary number represented by said third binary signals for terminating the flash of the device, said exposure modification signal shifting said sole bit monitored by said processor means by 1-bit position for modifying the exposure of the film.

37. A calculator/control apparatus according to claim 36 and further including reset means for resetting said third input means.

38. A calculator/control apparatus according to claim 37 and further including: fourth input means manually actuable by the photographer for generating a manual mode data signals; and means responsive to the generation of said manual mode signal for commanding said reset means to maintain said third input means reset.

39. A calculator/control apparatus according to claim 37 and further including means responsive to the photographer flashing the flash device for commanding said reset means to reset said third input means.

40. Apparatus according to claim 36 and further including visual display means for displaying an f-number value, an ASA film speed value and distance information; and wherein said processor means controls the values displayed by said display means, and said processor means solely changes the distance information displayed in response to said exposure modification signal.

41. In a photoflash system having a flash device and means for firing the latter to produce light on a subject to be photographed and means for arranging the flash device in a bounce mode, a display apparatus for visually displaying distance information to the photographer, comprising:
first input means manually actuable by the photographer for generating first binary signals representative of a value of a first photographic variable;
second input means manually actuable by the photographer for generating second binary signals representative of a value of a second photographic variable;
processor means responsive to said first binary signals and said second binary signals for generating third binary signals representative of a distance value dependent on said first and said second photographic variables;
visual display means response to said third binary signals for displaying said distance value;
blanking means coupled to said visual display means, for selectively blanking the display of said distance value; and
lens monitoring means responsive to the flash device being arranged in a bounce mode for commanding said blanking means to selectively blank said display of said distance value.

42. A display apparatus according to claim 36 wherein said display means displays said value of said first photographic variable and said value of said second photograhic variable; and said lens monitoring means commands said blanking means to solely blank said display of said distance value.

43. In a photoflash system having a flash device and means for firing the latter in an automatic mode or in a manual mode to produce light on a subject to be photographed, a display apparatus for visually displaying distance information to the photographer, comprising:
ASA input means manually actuable by the photographer for inputting ASA data respresentative of one of a plurality of ASA film speeds, each of the film speeds representable being a power of two multiple of an ASA film speed, said ASA input means commanding generation of first binary signals representative of the power of two change in ASA of the represented ASA input from an initialized ASA film speed value;
f-number input means manually actuable by the photographer for inputting f-number data representative of a camera f-number, said f-number input means commanding generation of second binary signals representative of a change in f-stop positions of the represented f-number input from an initialized f-number value;
automatic/manual input means manually actuable by the photographer for inputting mode data for instructing a manual or an automatic mode of operation of the flash of the flash device;
arithmetic processing means for receiving inputs of said first and said second binary signals, and generating third binary signals representative of a binary number having a magnitude dependent on the relative change of both the represented ASA and f-number from their respective said initialized values and dependent on said mode data;
generation means responsive to said third binary signals for generating distance display signals for display of a single distance when in the automatic mode and for display of a range of distances when in the manual mode; and
display means responsive to said distance display signals from said generation means for visually displaying distance information.

44. In a photoflash system having a flash device and means for firing the latter to produce light on a subject to be photographed, a calculator/control apparatus for visually indicating acceptable exposure occurence to the photographer, comprising:
first input means manually actuable by the photographer for generating first binary signals representative of a value of a first photograhic variable;
second input means manually actuable by the photographer for generating second binary signals representative of a value of a second photographic variable;
light sensing means arrange for monitoring light coming from the photographic scene and for generating third binary signals represenative of a total quantity of light monitored;
processor means for receiving said first binary signals and said second binary signals and for generating fourth binary signals representative of a quantity of light to be received from the photographic scene;
said processor means for monitoring a sole bit of the binary number represented by said third binary signals for terminating the flash of the flash device responsive to said third binary signals representing a total quantity of light equal to the quantity of light represented by said fourth binary signals and for monitoring the immediate two least significant bits adjacent said sole bit in said binary number represented by said third binary signals for generating an annunciator signal responsive to said third binary signals representing a total quantity of light substantially one-half an EV less than the quantity of light represented by said fourth binary signals; and
annunciator means responsive to said annunciator signal for signaling the photographer of an acceptable exposure occurence.

45. In a photoflash system having a flash device and means for firing the latter to produce light on a subject to be photographed, a display apparatus for visually displaying distance information to the photographer, comprising;
ASA input means manually actuable by the photographer for inputting ASA data representative of one of the plurality of ASA film speeds, each of the film speeds representable being a power of two multiple of an ASA film speed, said ASA input means commanding generation of first binary signals representative of the power of two change in ASA of the represented ASA input from an initialized ASA film speed value;
f-number input means manually actuable by the photographer for inputting f-number data representative of a camera f-number, said f-number input means commanding generation of second binary signals representative of a change in f-stop positions of the represented f-number input from an initialized f-number value;

value input means for inputting data representative of one of a plurality of values of a photographic variable indicative of exposure modification, each of the values representable being a power of two multiple of a value of the photographic variable, said value input means commanding generation of third binary signals representative of the power of two change of the represented value input from an initialized value of the photographic variable;

arithmetic processing means for receiving inputs of said first, said second and said third binary signals, and generating fourth binary signals representative of a binary number having a magnitude dependent on the relative change of the represented ASA f-number and the said photographic variable from their respective said initialized values;

generation means responsive to said fourth binary signals for generating distance display signals; and display means responsive to said distance display signals from said genertion means for displaying visual distance information, whereby a distance value may be displayed representative of a distance at which a picture taken with the photoflash system will be underexposed or overexposed.

* * * * *